United States Patent Office
3,707,414
Patented Dec. 26, 1972

3,707,414
NOVEL COMPOSITE STRUCTURE FROM RESOLE RESINS AND INORGANIC NODULES
Marco Wismer, Gibsonia, and Joseph F. Bosso, Lower Burrell, Pa., assignors to PPG Industries, Inc., Pittsburgh, Pa.
No Drawing. Filed Jan. 8, 1968, Ser. No. 696,103
Int. Cl. C08g 53/10
U.S. Cl. 156—78                 3 Claims

ABSTRACT OF THE DISCLOSURE

This invention relates to composites of inorganic cellular nodules in foamed phenolplast resins. These compositions are useful as thermal insulation in a variety of applications, including building materials such as slab-stock insulation.

There exists an ever-increasing demand for thermal insulating materials which may be utilized in prefabricated panels. However, many of the existing insulating materials, especially foamed resins such as polyurethanes, polyepoxides and unsaturated polyesters, while fire-retardant, produce copious amounts of dense smoke when exposed to fire. The foamed insulating materials of the invention, in addition to being excellent thermal insulation, do not release an appreciable amount of smoke when heated or exposed to flame.

Another important criteria for a building panel is the retention of strength during and after exposure in flame or intense heat, for example, 2000° F. Foamed panels, even foamed phenolic panels, will decompose and eventually lose their insulating properties and strength, as well as losing adhesion of the foamed material to the exterior surfaces of a panel. The foam of the invention has shown excellent strength and adhesion upon similar exposure.

The foam of the instant invention comprises a foamed phenolplast resin having dispersed throughout inorganic cellular nodules. In a preferred embodiment, a gypsum board is encased by the foams of the invention to further enhance the insulative properties of the system, especially the fire resistance of the panel.

The inorganic cellular nodules utilized in the composition of the invention act as a heat sink. This inorganic cellular nodule may be any inert inorganic nodule having a majority of closed cells. Typical of these nodules are foamed or cellulated nodules which may be characterized as glass, ceramic or refractory, many of which are known in the art.

Examples of the inorganic cellular nodules which may be utilized in the practice of this invention include foamed glass pellets having a fused, generally impervious outer skin, such as described in U.S. Pat. No. 3,325,341; as well as bubbled alumina such as Alundum fused alumina, an essentially hollow alumina sphere. Likewise, cellular zirconia may be employed as well as any other vitreous, argillaceous or refractory cellular material.

The size of the inorganic cellular nodules may vary widely. For most applications, it is preferred that the nodules have a diameter between about $\frac{1}{32}$ inch and about one inch. Most preferably, nodules having a diameter between about $\frac{1}{8}$ inch and $\frac{1}{2}$ inch are employed.

A presently preferred inorganic cellular nodule is described in British Pat. No. 1,055,908. These nodules are prepared by admixing preformed glass particles and a cellulating agent, and then comminuting the mixture. The comminuted admixture is wetted with a material which contains a binder and a fluxing agent. The wetted mixture is pelletized and the pellets may be dried or cured to permit at least a part of the fluxing agent in the pellet to vibrate to the pellet's outer surface. The pellet external surface is coated with a glass-former that also serves as a parting agent. A sufficient amount of the glass-former is applied to the external surface of the pellet to prevent pellets from agglomerating in the cellulating furnace. The coated pellets are then heated at a cellulating temperature within a roating cellulating furnace. During cellulation, a portion of the fluxing agent on the surface of the pellet reacts with or activates the glass-former at the elevated temperature to form a thin skin of vitrified material having a composition different from the glass which forms the cellulated core of the pellet. The cellular nodules formed by the above process have a low density and an external surface of a vitrified material differing from the glass forming the cellulated core of the nodule.

The nodule may thus be described as a core formed of cellular glass having a plurality of uniform, coherent bubbles of glass, a thin outer skin of a vitrified material having a composition other than the glass core.

A specific example of a glass nodule which may be utilized in the invention follows hereinafter, but is not intended to be a limitation, since any inorganic cellular nodule, being inert, may be utilized. All parts and percentages throughout the specification are by weight unless otherwise specified.

EXAMPLE A

A typical soda-lime-glass cullet was admixed with 0.4 percent by weight carbon black and 0.4 percent by weight sodium sulphate. The admixture was comminuted in a ball mill until more than 95 percent of the admixture passed through a 200 mesh screen. The admixture was wetted with a liquid binder consisting of 1.3 percent by weight sodium silicate in water. The wetted admixture contained about 12 percent by weight of the liquid binder. The admixture was pelletized and formed into green pellets having an approximate diameter of between about $\frac{5}{16}$ inch and $\frac{3}{8}$ inch. The pellets were dried in an oven at an approximate temperature of 250° F. for a period of about 8 hours. After this period there was no further weight loss by additional drying. The dried pellets were coated with aluminum hydrate and then subjected to a cellulating temperature of about 1600° F. in a cellulating furnace for a period of about 15 minutes. The cellular nodules had an approximate diameter of between $\frac{1}{2}$ inch and $\frac{3}{4}$ inch, and a density of about .11 gram per cubic centimeter. The cellular nodules had a chemically durable surface coating of high alumina glass.

The phenolic resin foams which may be utilized as binders for the foam composites of this invention comprise those foams derived from resole phenolic resins containing between 1.1 and about 7 moles, and preferably 1.2 to 4.0 moles of formaldehyde per mole of phenol, as conventionally made after the phenolic resin has been condensed. When the formaldehyde ratio exceeds about 7 to 1, the foam produced does not have sufficient strength and during the foaming stage the lack of viscosity and cell strength cause the foam to collapse upon contact with the nodules. On the other hand, below the 1.1 to 1 formaldehyde ratio, the viscosity of the resin is so high as to cause the foam to push the nodules ahead rather than rising around them.

As base is commonly employed to catalyze the resole condensation which may be, but need not be, neutralized with an appropriate acid. Generally, aqueous solutions of formaldehyde are used for this starting material. The preparation of resole phenolic resins is well-known in the art and it is needless to recite the details of their preparation. Water (usually derived from the use of aqueous formaldehyde, for example, a 35 percent to 40 percent solution) may remain in the resin utilized in the foam. Generally, however, it is preferred to have less than about 25 percent water in the resin. The resin preferably should contain at least about 2.0 percent water although amounts as low as about 1.0 percent may be employed.

Another resole resin which may be utilized is a resin of the type discussed above wherein all or a portion of the water present is exchanged with a polyol such as, for example, polyols such as ethylene glycol, propylene glycol, butylene glycols, glycerol and the like, including polyoxyalkylene glycols. Likewise, polyether polyols and polyester polyols such as are conventionally employed as polyols in the manufacture of urethane foams may be added. These include oxyalkylation products of sucrose, sorbitol and trimethylolpropane. An example of polyester polyols includes a trimethylolethane-ethylene glycol adipate phthalate with an OH value of 450 like the other polyester polyols known in the art may be employed.

The phenol-aldehyde resin is usually combined with a blowing agent and a catalyst which promotes polymerization of the resole resin. If desired, conventional foam adjuvants, such as cell stabilizing agents, may also be incorporated.

The blowing agent may be a material which decomposes in the presence of an acid catalyst and/or heat to produce carbon dioxide. This includes the carbonates and dicarbonates of sodium, potassium, ammonium, calcium, magnesium, as well as others.

Organic gas-liberating agents, such as diazonium salts, for example, benzenediazonium sulfate, dinitropentamethylene tetramine, and p,p'-oxybis(benzene sulfonyl hydroxide) may also be utilized.

Likewise, metal powders such as powdered aluminum, zinc and magnesium may be used to generate hydrogen in the presence of acid catalysts.

The resole resins are foamed in the presence of an acid catalyst, which may be a mineral acid such as hydrochloric, sulfuric or phosphoric; or an aromatic sulfonic acid such as toluene sulfonic, benzene sulfonic or phenyl sulfonic. Peroxide catalysts may also be used; however, these require heating to commence the action in foaming. Mixtures of acid may be used as a means of controlling the rate of foaming and set time.

The above discussion has been limited to phenolformaldehyde resole resins, and similar resins prepared from other phenols and aldehydes may also be prepared. Thus, phenol may be replaced by a cresol, for example, metacresol; by xylenols, such as 3,5-xylenol; or by resorcinol, as well as mixtures of phenols. Likewise, the aldehyde portion of the resin may be replaced by acetaldehyde, butyraldehyde, propionaldehyde, acrolein or furfural, as well as mixtures of the above with formaldehyde.

The phenolic resole resin foams utilized as binders for the composites of this invention are well-known in the art and are described in Rigid Plastic Foams, G. H. Ferringo, Reichhold Publishing Corporation (1963), as well as elsewhere in the literature.

The composites of the instant invention are formed by any of several methods. The mold utilized to prepare an article, such as a brick of the desired shape, or the final structural form, such as a hollow building panel in which the composite forms an insulative inner core having the desired exterior surfaces, such as building panel having steel, wood, aluminum, fiberboard or other exterior surfaces, is filled with inorganic cellular nodules. A sufficient quantity of a foamable resinous mixture (hereinabove described) is poured or injected into the cavity containing the nodules, wherein it is caused to foam, filling the interstices between the glass nodules, the resole resin foam being cured in a conventional manner.

More preferably, however, a predetermined quantity of foamable mixture is placed in the bottom of the mold or structural unit and then, prior to the time that substantial foaming occurs, the mold or panel is filled with glass nodules, preferably being firmly packed. When the resin commences to foam, it rises about the nodules and, upon curing, adheres the nodules to one another and forms a strong, rigid unit.

Yet another method of forming composites of this invention comprises admixing the nodules and a predetermined quantity of foamable resin prior to charging the mixture into the mold or structural unit. The mixture should, however, be charged into the unit before substantial foaming of the resin takes place. Obviously, in this case, the use of a more latent foaming mechanism is preferred.

Where free foams are desired, the mold should have a surface, for example, Teflon, which will release the foam since the foams have excellent adhesion to steel and similar materials.

The following examples, I through VI, are drawn to a preparation of the foamable resins which may be utilized as binders for the composite foams of this invention.

EXAMPLE I

Into a reactor equipped with stirrer, thermometer, reflux condenser and heater were charged 517 parts of phenol and 1782 parts of 37 percent formaldehyde along with 0.426 part of barium hydroxide octahydrate and 5.80 parts of sodium hydroxide. The mixture was heated with stirring at a temperature of 100° C. for 1 hour. The reaction mixture was then stripped by distillation under a vacuum of 60 millimeters of mercury with a head temperature varying from 30° C. to 35° C. 964 parts of distillate were collected. The product contained 74.7 percent solids and 12.89 percent water, and had a Gardner-Holdt viscosity of $Z_2$–$Z_3$ at 25° C. and a pH of 7.4.

EXAMPLE II

Into a reactor equipped with a stirrer, thermometer, reflux condenser and heater were charged 517 parts of phenol and 1782 parts of 37 percent formaldehyde, along with 0.426 part of barium hydroxide octahydrate and 5.80 parts of sodium hydroxide. The reaction mixture was heated at 100° C. for approximately 50 minutes. The reaction mixture was then stripped of volatiles under a vacuum varying between 17 and 30 millimeters of mercury with a head temperature varying between 30° C. and 34° C. 380 parts of distillate were collected. The resin had a Gardner-Holdt viscosity of X at 25° C. and contained 65.3 percent solids and 10 percent water.

EXAMPLE III

Into a reactor equipped with stirrer, thermometer, reflux condenser and heater were charged 141 parts of phenol and 728 parts of 37 percent formaldehyde, along with 0.163 part of barium hydroxide octahydrate and 2.19 parts of sodium hydroxide. The reaction mixture was heated at 100° C. for one hour. The reaction mixture was then stripped of volatiles under a vacuum of between 15 and 20 millimeters of mercury with a head temperature varying between 25° C. and 35° C. 418 parts of distillate were collected. The final product had a pH of 7.4, viscosity of 9700 centipoises at 25° C., and contained 71.3 percent solids and 9.04 percent water.

EXAMPLE IV

Into a reactor equipped with stirrer, thermometer, reflux condenser and heater were charged 598.5 parts of phenol and 1021.6 parts of 37 percent formaldehyde, along with 0.301 part of barium hydroxide octahydrate and 4.07 parts of sodium hydroxide. The reaction mixture was heated at 96° C. for 50 minutes. The reaction mixture had a pH of 8.6. There was added 10 parts of a 20 percent oxalic acid solution, which lowered the pH to 7.9. There was then added an additional 4 milliliters of 20 percent oxalic acid, which lowered the pH to 7.3. The reaction mixture was then stripped under a vacuum ranging between 15 and 28 millimeters of mercury with the head temperature varying between 25° C. and 31° C. 418.7 parts of distillate were collected. The product contained 57.4 percent solids and 4.87 percent water.

EXAMPLE V 75 parts of the resin of Example I were weighed into a container and 1.5 parts of Tween 40 (polyoxyethylene sorbitan monopalmitate) were thoroughly admixed. 1.1 parts of china clay were then added to the mixture and well blended. There was then admixed 1.1 parts of aluminum powder, 20 parts of an acid solution comprising 20 percent p-toluene sulfonic acid, 15 percent phosphoric acid and 65 percent water and the mixture stirred until uniform. 45 parts of the above resin mixture were poured into a metal mold, 10" x 4" x 2", and 165 parts of glass nodules ⅛ to ¼ inch in diameter were poured on top of the resin. A metal cover was placed on top of the mold and was held in place by four C-clamps. The mold was laced in an oven at 300° F. for 30 minutes, after which time the mold was removed. The resin completely filled the mold and encapsulated all the nodules.

EXAMPLE VI 75 parts of the resin of Example II, 1.5 parts of Tween 40, 1.2 parts of china clay and 0.6 part of aluminum powder were mixed until uniform. There was then added 13.5 parts of an acid solution comprising 15 percent phosphoric acid, 20 percent p-toluene sulfonic acid and 65 percent water. The mixture was stirred for 45 seconds, and 60 parts of the mixture were poured into a metal mold 10" x 4" x 2". 160 parts of glass nodules, ¼ to ⅛ inch in diameter, were poured on top of the resin and packed down tightly. The mold was covered with a metal plate and put in an oven at 300° F. for 30 minutes, after which time the mold was removed. The resin completely filled the mold and encapsulated all the nodules.

EXAMPLE VII 75 parts of the resole resin of Example III were admixed with 1.5 parts of Tween 40. After the mixture was homogeneous, 1.2 parts of china clay were added and blended. There was then added 1.1 parts of aluminum powder and 20 parts of an acid solution comprising 20 percent p-toluene sulfonic acid, 15 percent phosphoric acid and 65 percent water. The mixture was stirred until uniform. 45 parts of the mixture were poured into a metal mold and 165 parts of glass nodules, ⅛ to ¼ inch in diameter, were poured on top. A metal cover was placed on top of the mold and held in place by C-clamps. The metal mold was placed in an oven at 300° F. for 30 minutes. At the end of this period, the metal mold was removed and the foam almost completely filled the mold, except for one small part at one of the corners, and with the exception that all the nodules were adhered.

EXAMPLE VIII

A resole resin was prepared as follows:
Into a reactor equipped with stirrer, thermometer, reflux condenser and heater were charged 612 parts of phenol and 1580 parts of 37 percent formaldehyde, along with 0.410 part of barium hydroxide octahydrate and 5.55 parts of sodium hydroxide. The reaction mixture was heated at 100° C. for 50 minutes. The reaction mixture was then stripped at a vacuum varying between 16 and 20 millimeters of mercury with a head temperature varying between 27° C. and 30° C. 759.8 parts of distillate were collected. The pH of the resin was 7.35 and contained 66.4 percent solids and 10.51 percent water.

EXAMPLE IX

A foam composite was prepared by admixing 80 parts of the resin of Example VIII and 20 parts of the resin of Example IV. There were then added individually and mixed until uniform 1.0 part of the diglycidyl ether of Bisphenol A; 2.0 parts of Tween 40; 1.0 part of an epoxy cyclohexyl adipate, $$O(C_6H_8)(CH_3)CH_2OCOC_4H_8COO(C_6H_8)(CH_3)O$$

1.6 parts of china clay, and 0.8 part of aluminum powder. The above materials were stirred until uniform and there were added 18 parts of an acid solution comprising 20 percent p-toluene sulfonic acid, 15 percent phosphoric acid and 65 percent water. The mixture was stirred for 45 seconds and 80 parts of the mixture were poured into a mold 10" x 4" x 2". 185 grams of glass nodules ⅛ to ¼ inch in diameter were poured on top of the resin and packed down. The mold was covered and put into an oven at 325° F. for 30 minutes, after which time it was found that the resin had completely filled the mold and encapsulated the nodules. The mold was strong and showed initial density of about 11.9 pounds per cubic foot. The molded material was then post-cured at 325° F. for 1½ hours, and the density after post-curing was 11 pounds per cubic foot.

EXAMPLE X

A foam composite was prepared by admixing 2083 parts of the resole resin of Example VIII, 41.6 parts of Tween 40, 33.3 parts of china clay, 16.7 parts of aluminum powder, and 417 parts of an acid solution containing 40 percent water, 40 percent phosphoric acid, 20 percent p-toluene sulfonic acid. All the above materials except the acid solution were mixed and blended well, the acid solution was then added and the mixture stirred for 30 seconds. The material was poured into a 31" x 31" x 2" wooden mold internally faced with 31" x 31" carbon steel plates. Centered in this mold was a 27" x 31" x ½" piece of fire-rated gypsum board. The resin was poured on each side of the gypsum board, which was held in place by the resole resin foam spacers. Glass nodules with a density of 12 pounds per cubic foot were poured on top of the resin and tamped down. The remainder of the mold was packed well with glass nodules. A metal plate was clamped on top of the mold with wing nuts and the mold placed in a large, walk-in oven for an hour at a temperature of 325° F. The material rose and substantially completely filled the mold and completely encased the gypsum board. The wooden mold was stripped away from the steel plates. The steel plates adhered to the foamed composite.

EXAMPLE XI

A resole resin was prepared as follows:
Into a reactor equipped with stirrer, thermometer, reflux condenser, and heater were charged 846 parts phenol, 1542 parts of a 37 percent formaldehyde solution, along with 5.76 parts of soduim hydroxide and 0.426 part of barium hydroxide.

The reaction mixture was heated at 100° C. for 15 minutes, after which it was cooled. The pH of the reaction mixture was 8.1.

Into a second reactor was charged 860 parts of a polyether polyol comprising the reaction product of one mole sucrose, 14.5 moles propylene oxide and 4 moles of ethylene oxide with a hydroxyl value of 470. The above resole resin was slowly added to the polyol over a period of 15 minutes. The mixture was distilled under a vacuum of 15 millimeters of mercury with a pot temperature of between 35° C. and 50° C. As the mixture became more viscous with the removal of water, small amounts of benzene were added which were removed by distillation, along with the remaining water. The distillation was continued, adding benzene from time to time to control the viscosity, until after total stripping of water and benzene, the percent water was reduced to 0.934. The resultant resin had a hydroxyl value of 548 and an acid value of 11.15.

A foam was prepared in the following manner: The following materials were thoroughly mixed: 50 parts of the above resole resin, 1 part of Tween 40, 0.8 part of china clay, 0.4 part aluminum powder. After a thorough mixing there were added 10 parts of an acid solution comprising 40 percent water, 40 percent phosphoric acid, 20 percent p-toluene sulfonic acid. The material was poured into a small mold which was filled with glass nodules and stoppered with a vented cork. The mold was placed in an oven at 300° F. for 30 minutes. The foam rose to almost fill the mold. The foam was soft but held the nodules together well.

The foam composites of this invention are unique in that they do not support combustion, nor when they are exposed to flame do they create any significant quantity of visible fumes or smoke. The resin binder chars, but generally the charred structure retains much of the strength of the original material.

The foams of the invention make it possible to erect a completely assembled, flame-resistant building panel, where heretofore frequently two or three on-site steps were required.

While specific examples of the invention have been set forth hereinabove, it is not intended to limit the invention solely thereto, but to include all the variations and modifications thereof which are within the scope of the appended claims.

We claim:
1. A method of forming a foamed, fire-resistant panel comprising a gypsum board encased in a foam, which method consists essentially of:
   (A) positioning a gypsum board in a cavity;
   (B) placing a foamable resole resin with a formaldehyde/phenol ratio of between about 1:1 to about 7:1 containing about one percent to about 25 percent by weight of water in the cavity;
   (C) filling the cavity with discrete inert inorganic multicellular nodules; and
   (D) causing the resole resin to foam, filling the interstices with resole foam, thereby forming a coherent, fire-resistant insulative article.
2. A method as in claim 1 wherein the resole resin (B) is a phenol-formaldehyde resin containing up to 25 percent by weight of a polyol.
3. A method as in claim 1 wherein the inorganic multicellular nodule (C) is a glass nodule having a diameter between about 1/32 inch and about one inch.

References Cited

UNITED STATES PATENTS

| | | | |
|---|---|---|---|
| 2,629,698 | 2/1953 | Sterling | 260—2.5 F |
| 2,806,509 | 9/1957 | Bozzacco | 260—2.5 F |
| 3,062,682 | 11/1962 | Morgan et al. | 260—2.5 F |
| 3,271,331 | 9/1966 | Ender | 260—2.5 F |
| 3,325,341 | 6/1967 | Shannon | 106—40 |
| 3,223,576 | 12/1965 | Evans et al. | 161—159 |
| 3,354,024 | 11/1967 | D'Eustachio et al. | 260—2.5 |
| 3,510,392 | 5/1970 | D'Eustachio et al. | 260—2.5 |

FOREIGN PATENTS

| | | | |
|---|---|---|---|
| 1,090,741 | 11/1967 | Great Britain | 260—2.5 F |
| 659,008 | 6/1965 | Belgium | 260—2.5 |
| 1,055,908 | 1/1967 | Great Britain | 260—2.5 |

JOHN C. BLEUTGE, Primary Examiner

U.S. Cl. X.R.

52—309; 161—159, 160, 162, 257; 260—2.5 B, 2.5 F, 38; 264—46, 54, DIG. 2 and 6.